United States Patent [19]
Beebe

[11] 3,788,518
[45] Jan. 29, 1974

[54] PNEUMATIC SEED DISPENSER
[75] Inventor: Raymond A. Beebe, Detroit, Mich.
[73] Assignee: Massey-Ferguson, Inc., Detroit, Mich.
[22] Filed: Jan. 15, 1973
[21] Appl. No.: 323,604

[52] U.S. Cl. .............................................. 221/211
[51] Int. Cl. ............................................ A01c 7/04
[58] Field of Search .................... 221/211; 198/20 C

[56] References Cited
UNITED STATES PATENTS
| | | | |
|---|---|---|---|
| 2,737,314 | 3/1956 | Anderson | 221/211 X |
| 3,142,274 | 7/1964 | Winter | 221/211 X |
| 3,156,201 | 11/1964 | Tweedale | 221/211 X |
| 3,100,462 | 8/1963 | Steele et al. | 221/211 X |

Primary Examiner—Robert B. Reeves
Assistant Examiner—John P. Shannon
Attorney, Agent, or Firm—Robert L. Farris

[57] ABSTRACT

A seed dispenser has a wheel rotating in a seed housing with the wheel having a plurality of radially extending spoke-like seed selecting tubes connected to a common manifold in turn connected to a pressure source. The connection of the tubes in the passages forms a venturi throat in the passage thus causing a reduction of pressure in the tubes when air is flowing through the passages. Means are provided to selectively and sequentially cut off flow of air out of said passages so that air is forced to flow out of the tubes when the connected tube is at a predetermined circumferential position.

10 Claims, 4 Drawing Figures

PNEUMATIC SEED DISPENSER

This invention relates to dispensing apparatus and more particularly to apparatus for dispensing seed.

In order to provide apparatus that can dispense individual particles without misses and without doubles, there have been many proposed devices. Seed planting apparatus wherein seeds of varying size and shape are selected from a supply and are dispensed in a precision equal spacing manner have generally been rather complicated utilizing many moving parts that can wear and become misadjusted.

It is, therefore, an object of this invention to provide a particle dispenser that is simple in construction and yet is effective in operation.

This and other objects and advantages will be readily apparent from the following description and accompanying drawing in which.

Figure 1:
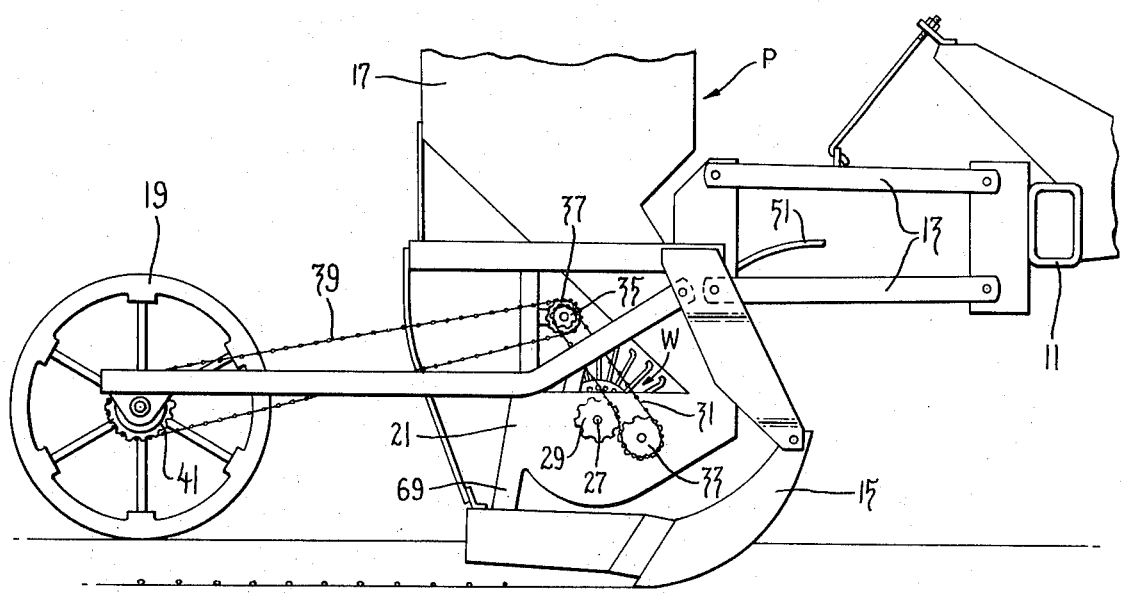
FIG. 1 shows a row type seed planter incorporating the invention.

Referring now to the figures which show a preferred embodiment, FIG. 1 shows a single row crop planter generally indicated P which is supported on a frame 11 by parallelogram linkage 13. The planter which may be only one of a series mounted on the frame includes furrow opener 15, a seed box 17, a ground drive and press wheel 19 and the dispensing mechanism.

The dispensing unit includes a seed receiving housing 21 having side walls 23 that converge to form a seed trough 25. Journaled in the side walls is a rotor or wheel, generally designated W, which includes a drive shaft 27 on which a sprocket 29 is driven by a chain 31. The chain 31 passes over an adjustable idler sprocket 33 and a drive sprocket 35 which is driven by a sprocket 37 in turn driven by a chain 39 connected to a drive sprocket 41 connected to be driven by the press wheel 19. The shaft 27 carries a two piece hub including circular castings 43 and 45 that are held together by bolts 47. The castings 43 and 45 form therebetween a manifold 49. A hollow air supply tube 51 extends into the casting 45 and seal 52 provides an airtight fit. The tube 51 is connected to an air supply or compressor unit (not shown) of any suitable type carried on the planter.

Figure 3:
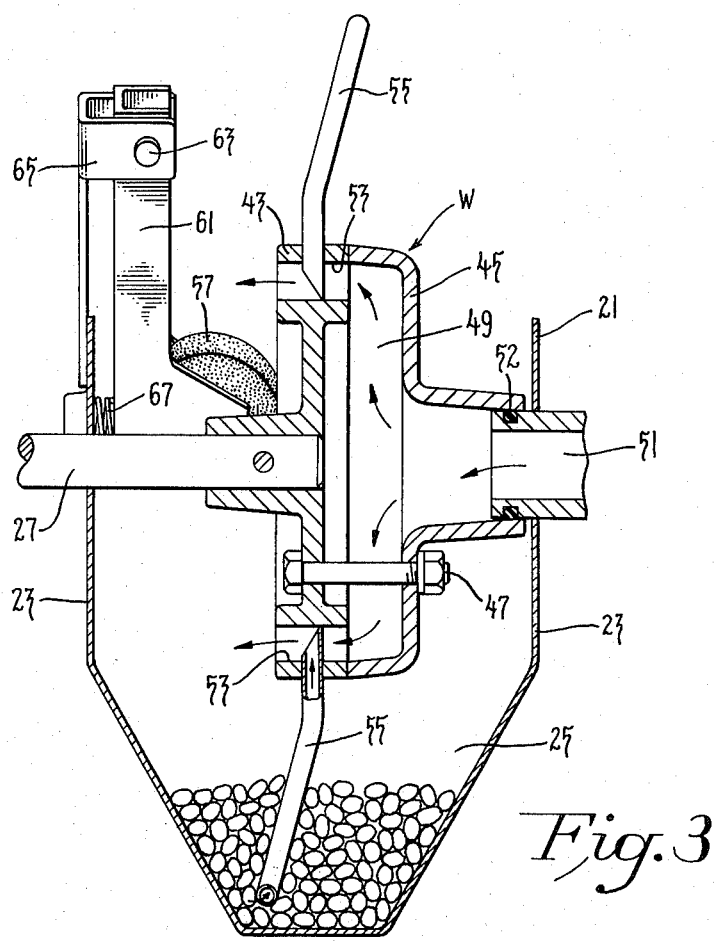
FIG. 3 is a sectional view taken on the line 3—3 of FIG. 2.

The casting 43 includes a plurality of circumferentially spaced axial passages 53 that connect the manifold 49 to the housing interior. A plurality of circumferentially spaced radially extending spoke-like hollow members 55 extends into the passages 53 as shown in FIG. 3. The ends of the hollow members 55 are chamfered as shown to provide a varying cross section in the passage and to provide an opening into the member 55 that faces downstream of airflow through the passages.

As seen in FIG. 3 the spoke members 55 are bent in alternate directions to various degrees so that successive passes of the spokes 55 through the trough 25 will cause agitation of the seeds in the trough.

An airflow cut-off roller 57 made of flexible material such as rubber, engages the side of the wheel. The roller 57 is located at a radial distance, with respect to the wheel axis, equal to the radial location of the passages 53 to thereby roll over these passages. The roller 57 is carried on a shaft 59 that is journaled on a "u" shaped lever 61 that is pivoted at 63 on a bracket 65 supported on the housing 23. A spring 67 urges the lever 61 and roller 57 against the side of the wheel and compresses the same to form an airtight closure over any passage brought to a position adjacent to the roller 57.

A seed drop tube 69 is positioned tangentially to the path of rotation of the bent ends of the seed carrying spokes 55. The tube 69 extends downward between the split rear sides of the furrow opener 15.

OPERATION

When the source of air pressure is operated, air flows through the tube 51 into manifold 49. It then escapes out through all of the passages 53. With the exception of any passage closed by the roller 57, the air flows completely through the passages past the ends of the tubes 55. The reduced flow area at the tubes causes an increase in velocity and decrease in pressure at the tube ends. This decreased pressure causes a flow of air inwardly through the radially outward ends of the tubes. Where the tubes are in the mass of seeds this flow will cause a seed to be held against the end of the tube, the opening into each tube being smaller than the smallest size seed to be distributed.

Figure 2:
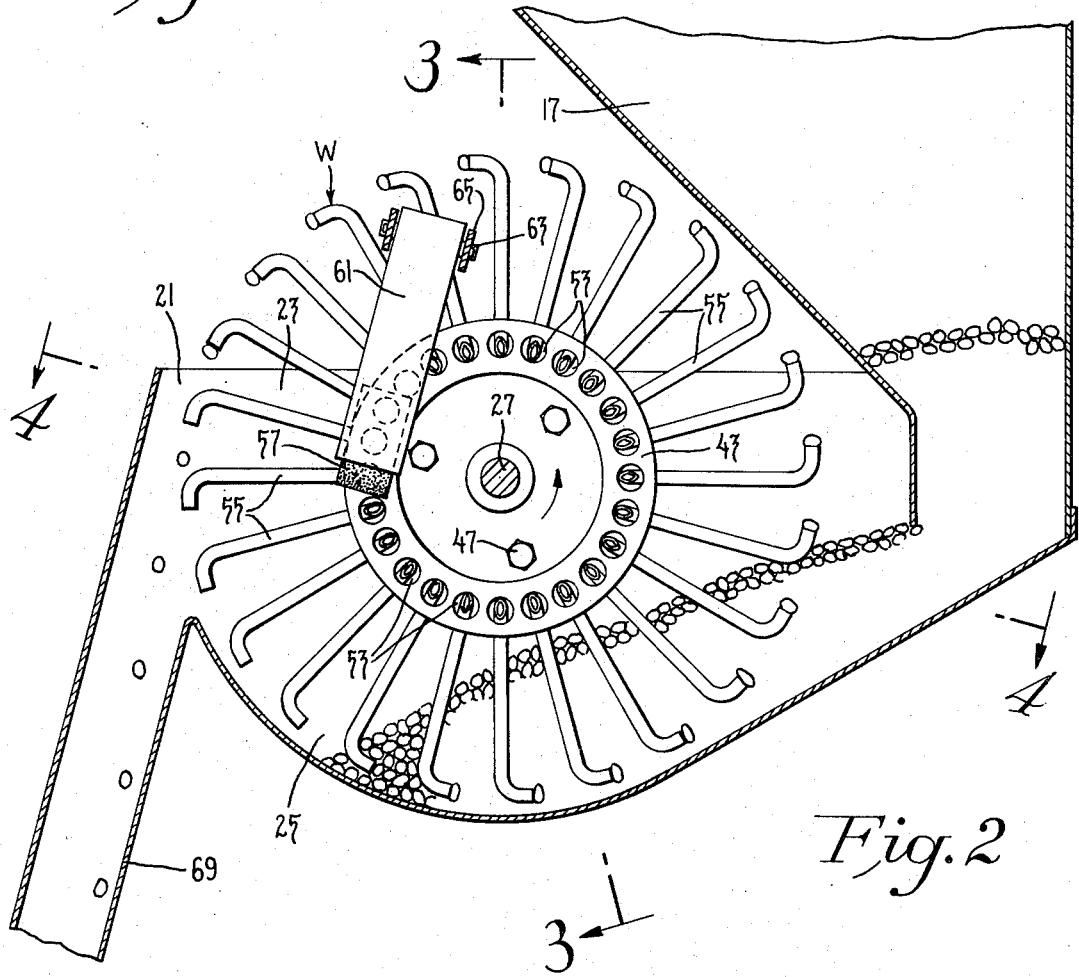
FIG. 2 is an enlarged sectional view of the dispensing apparatus.
Figure 4:
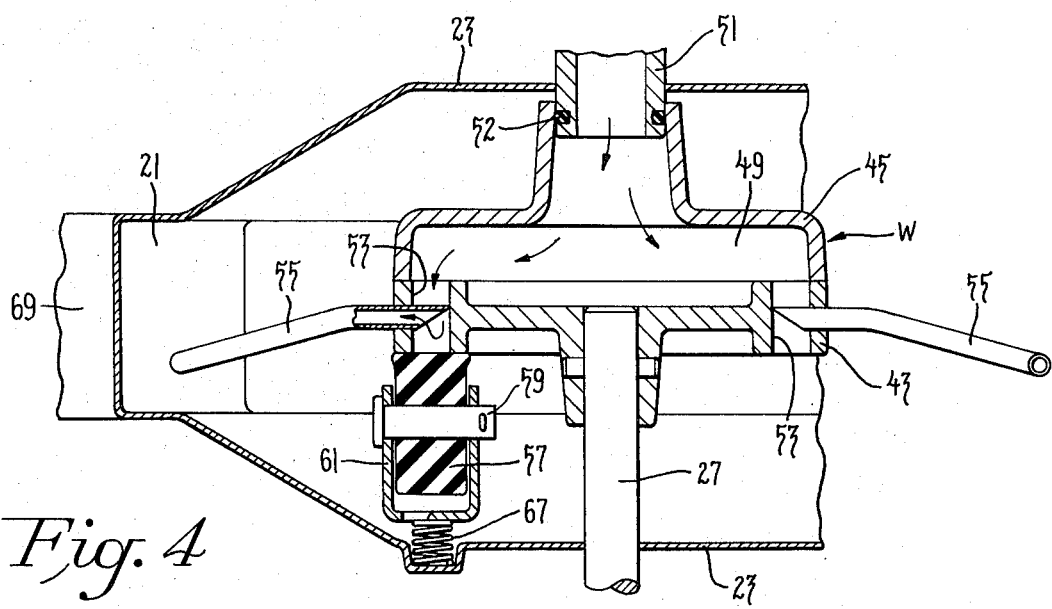
FIG. 4 is another sectional view taken on the line 4—4 of FIG. 2.

When the planter unit is pulled along, as by a tractor, the ground wheel 19 through the drive chains causes counterclockwise rotation (as viewed in FIG. 2) of the wheel W. As the spokes or tubes 55 are rotated, the seeds on the ends of the tubes are carried around therewith as seen in FIG. 2. As the passage 53 into which a particular tube 55 leads is brought adjacent to the roller 57, the roller cuts off the flow of air through the passage as seen in FIG. 4. The air continues to flow into the passage 53 but flows outwardly through the tube 55 to blow the seed carried on the radially outward end of the tube off and down into the drop tube 69 as seen in FIG. 2. The tube 55 continues around into the supply of seeds and another seed is held against the end of the tube by the inward flow of air.

Except for the conventional chain drives of the dispenser unit there are only two moving parts in the dispenser, namely the wheel W and roller 57. There are no adjustments to be made or disturbed. There is no wear on the parts. The tubes are self-cleaning since the airflow therethrough is reversed each revolution of the wheel W.

The outer ends of the tubes 55 could be made to receive different size tips so as to accommodate different varities of seeds. Alternatively, the complete tubes could be replaced. Likewise, the tubes could be removed from every second or third passage to increase the spacing of the seeds along the ground.

The seeds are not subjected to mechanical handling and hence not subjected to damage. Since the dispensing unit is compact, it can be located close to the actual point of implanting, thus increasing the accuracy of the seed spacing.

I claim:

1. Dispensing apparatus comprising a housing for holding a supply of particles to be dispensed, a wheel member mounted on a hroizontal axis in said housing, means to rotate said wheel, an air manifold adapted to be connected to a source of air under pressure, a plurality of circumferentially spaced passages connecting said manifold to the outside of the wheel, means in said passages forming a reduced flow area producing a high velocity low pressure point in said passage, a plurality of particle collecting means carried by said wheel and radially extending outward so as to pass through the lower portion of the housing as the wheel is rotated, each of said particle collecting means having a hollow outer tip having an opening smaller than the particles to be dispensed and connected to the reduced pressure points in one of said passages and blockage means for sequentially stopping flow of air through each of said passages as the particle collecting means connected thereto reaches a predetermined circumferential position.

2. The dispensing means of claim 1 wherein said particle collecting means comprise tubes extending into said passages, the ends of the tubes being tapered to form an opening facing downstream in said passage.

3. The dispensing means of claim 1 wherein said blockage means for stopping flow through the passages is downstream of the reduced flow point whereby when said blockage means is effective to block airflow out of the passage air will be forced outwardly through the collecting means to blow any particle on the outer tip away from said tip.

4. The dispensing means of claim 3 wherein said passages are circumferentially spaced around said wheel and the blockage means comprises a roller means mounted in said housing and rolling on a surface of said wheel to successively engage and block said passages as they pass the roller means.

5. The dispensing means of claim 4 wherein said roller means comprises a flexible surface engaging the wheel and wherein means are provided to bias said roller toward said wheel.

6. The dispensing means of claim 1 wherein said means to rotate the wheel operates at a speed proportional to movement of the housing along a path whereby the particles are dispensed at predetermined spacing along said path.

7. The dispensing means of claim 1 wherein said particle collecting means comprise radially extending hollow tubes bent at their radially outer ends in the direction of rotation of the wheel whereby particles will be engaged by the outer ends of the tubes as the wheel rotates.

8. The dispensing means of claim 7 wherein said tubes are also bent out of the plane of the wheel and wherein some of said tubes are bent different amounts so that the ends of the tubes passing through the particles pass through different planes.

9. A seed dispenser including a housing having a supply of seeds therein, a wheel mounted for rotation within said housing having a radially extending hollow member connected to an airflow passage in turn connected to a source of air under pressure, said hollow member connected to said airflow passage at a point normally having air pressure less than that in the housing and means to increase the air pressure at said points to a pressure greater than that in the housing whereby a seed engaged by the hollow member as it passes through the seeds will be first held against the end of the tube by pressure in said housing and then forced away by pressure from said source.

10. The seed dispenser of claim 9 wherein said reduced air pressure is produced by flow of air from said source passing a venturi throat in said passage at said point and said increased pressure is produced by preventing air from exiting said passage to force the same to exit through said hollow member.

* * * * *